June 7, 1938.  R. W. JOHNSON  2,119,992
REFLECTOR DEVICE
Filed April 17, 1935   2 Sheets-Sheet 1

INVENTOR
Roy Walter Johnson.
BY
ATTORNEYS

June 7, 1938.   R. W. JOHNSON   2,119,992
REFLECTOR DEVICE
Filed April 17, 1935    2 Sheets-Sheet 2
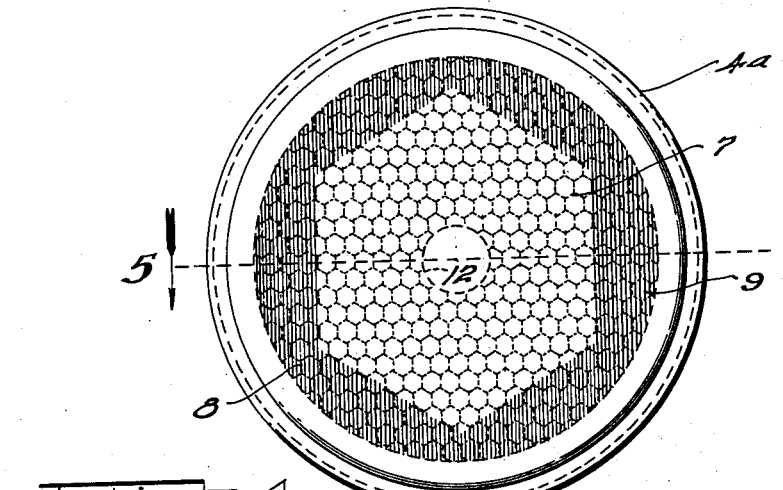
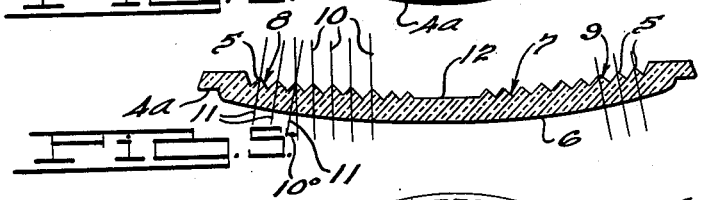
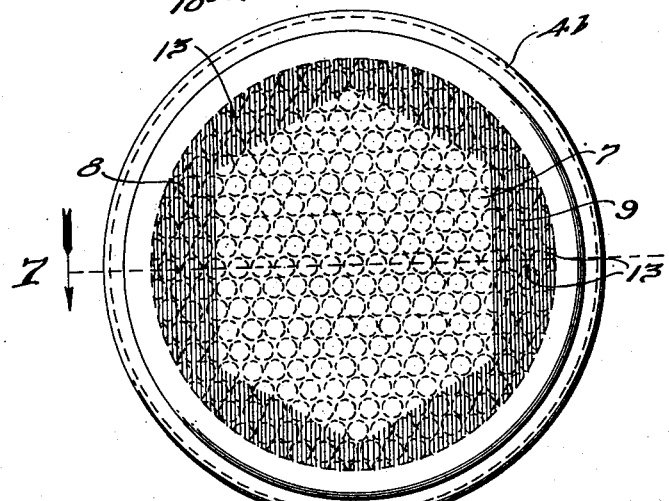
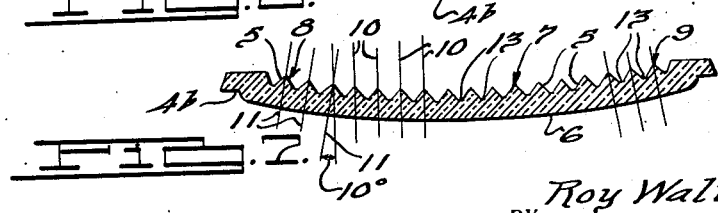
INVENTOR
Roy Walter Johnson.
BY
ATTORNEYS.

Patented June 7, 1938

2,119,992

UNITED STATES PATENT OFFICE 2,119,992

REFLECTOR DEVICE

Roy Walter Johnson, Wyoming, Ohio, assignor, by mesne assignments, to Chrysler Corporation, Highland Park, Mich., a corporation of Delaware Application April 17, 1935, Serial No. 16,881

6 Claims. (Cl. 88—82)

My invention relates to reflector devices provided primarily for use on the rear ends and sides of cars and also along highways to reflect back to an approaching automobile light rays projected therefrom as by their head-lights thus serving as a danger signal to the operator of the approaching vehicle; the invention relating more particularly, though not exclusively, to reflector devices of the type comprising a plate, or the like, of glass, or other suitable material, provided on a face thereof, and more especially its rear face, with groups of reflecting portions of such form as to reflect light rays projected against the plate, as by an approaching automobile, back to the approaching vehicle along lines substantially parallel with the rays striking the reflector, and thus to the eyes of the driver of the car.

To afford the necessary protection to approaching vehicles and to render highway signals satisfactorily operative, it is necessary that the reflector device not only reflect back the desired amount of light to the operator of the approaching car when light projected against it by the approaching car strikes the reflector at a substantially right angle to its face as when the car is traveling in a path at a right angle to the face of the reflector device and in direct alinement therewith on a substantially level road; or, in other words, in accurately alined relation to the reflector device, but also when the light strikes the reflector at an angle thereto from either above or below or from either side of the reflector, as for example, when the approaching car is traveling in a path offset laterally in either direction from the path of the car ahead and equipped with the reflector device.

It is therefore a purpose of my invention that the reflecting portions of the device be so formed and relatively positioned as to cause the area of the reflector device rendered luminous to the driver of the approaching car by the light rays cast upon it, to be divided into relatively large area zones of intense luminosity, preferably of the maximum intensity, observable by the driver of the car in approaching the device either directly in front of the reflector device or laterally offset therefrom in either direction within certain limits, respectively, regardless of the position of the source of projected light above or below the reflector device within the required range, and thus comply with such highway regulations as require that the areas of the device rendered luminous to the driver of the approaching car in the different relative positions of the source of the projected light and the reflecting device, be of a certain minimum candle power, thereby providing a construction which will function to obtain results heretofore possible only with a much more expensive construction.

As a preface to the following description it may be stated that the invention may be embodied in a structure provided solely for the reflective purpose or if desired, in a structure such as a tail light comprising the reflective feature referred to with a source of light to the rear of the reflecting element preferably with provision for the transmitting of the light from such source through the reflecting element, whereby the device serves to display an illuminated signal to the driver of an approaching car, either through the medium of the light source referred to or, if extinguished, the medium of the reflecting projections.

Referring to the accompanying drawings which show my invention embodied in a structure designed particularly for use where illumination is to be effected by light projected against it by an approaching car;

Figure 2:
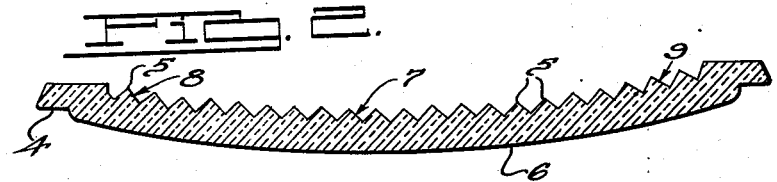
Figure 2 is a section taken at the line 2 on Fig. 1 and viewed in the direction of the arrow.
Figure 3:
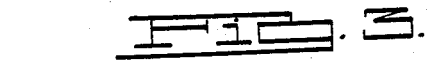

Figure 3, an enlarged view like Fig. 2 of a fragment of the structure shown in Fig. 2.

Figure 1:
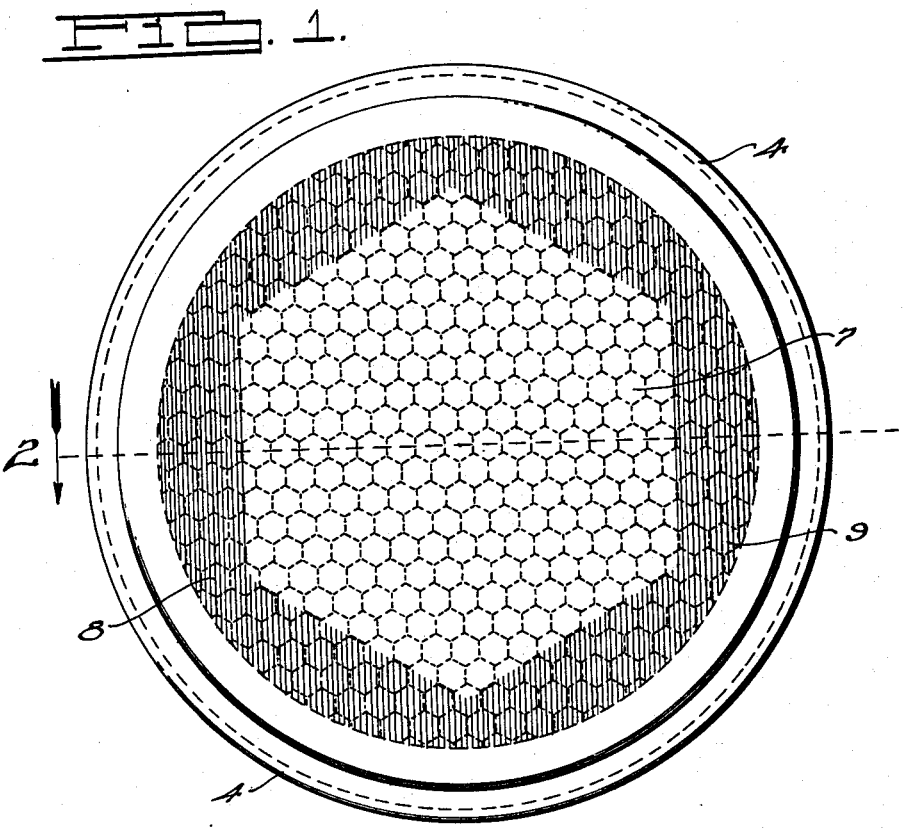
Figure 1 is a face view of a reflector structure embodying my invention.

Fig. 4 is a face view of a modified form of my reflector drawn to a smaller scale than the Fig. 1 reflector.

Fig. 5 is a section taken at the line 5 on Fig. 4 and viewed in the direction of the arrow.

Fig. 6 is a face view of a further modified form of my reflector also drawn to a smaller scale than the Fig. 1 reflector.

Fig. 7 is a section taken at the line 7 on Fig. 6 and viewed in the direction of the arrow.

The construction shown comprises a plate-like member 4 commonly termed a lens, preferably transparent and made of glass or other suitable material, preferably colored as desired, red glass being commonly used in structures of this same general character.

The member 4 is provided with rearwardly extending reflector portions or units shown as in the form of projections 5 on the rear face of the member 4 the projections being shown as closely spaced (though this is not essential to my invention) and covering a large part of the rear face area of the member 4.

The member 4 with its projections 5 is preferably made, as a matter of commercial expediency, by molding the member and projections, as for example of glass, as an integral one-piece structure.

As has been found desirable in reflector devices of this general type, the front face 6 of the member 4 is of spherical contour and the projections 5 likewise lie within a spherical surface substantially concentric with the spherical face 6.

The reflecting projections 5 as shown and preferably provided, are in the form of right cones with their bases of hexagonal shape whereby the bases of the cones interfit with each other as shown in Fig. 1, though such close spacing and the provision of the bases of the cones of hexagonal shape, is not necessary.

The providing of the projections 5 in the form of cones is preferred as a practical matter, more particularly, as such form of projections may be made very economically. However, as will be readily understood the reflecting projections may be provided of any other suitable form.

In accordance with my invention the projections 5 are so relatively disposed as to provide different zones of maximum luminosity observable, respectively, from different positions relative to the axis of the reflecting device. In the particular construction shown three of such zones are provided, viz.: a central zone 7, shown by the dotted lines in Fig. 1 as of hexagonal contour; and two lateral zones 8 and 9 which together surround the zone 7, the zone 8 comprising the half of the reflecting device at the left-hand side of Fig. 1 partially surrounding the zone 7, and the zone 9 comprising the remaining half of such part of the reflecting device. The zone 7 is provided to reflect back light rays to the driver of an approaching car when the car is directly in line with the reflector device; and the zones 8 and 9 are provided to reflect the light rays back to the driver when the source of projected light on the approaching car is laterally offset from the axis of the reflector to the left and to the right, respectively, in Fig. 1, as for example as has been found in practice, up to about 20 degrees, thereby providing relatively large zones of luminosity which serve as a warning signal to the driver of an approaching car whether he is approaching the signal device head on or in laterally offset position to either side. In Fig. 1 the zones 8 and 9 are shown as lightly surface-shaded to indicate that these zones are less luminous than the zone 7 when light rays are projected to the device in a path at a substantially right angle to the face of the device.

The several zones 7, 8, and 9 are provided for in the construction shown by forming all of the reflecting projections 5 within the zone 7 with their axes parallel and parallel with the axis of the reflector member 4 as indicated by the lines 10 (on Fig. 3) associated with such of the projections 5 of zone 7 as are shown in fragmentary view Fig. 3. The zone 8 is provided for by forming all of the projections 5 within this zone with their axes parallel and horizontal and disposed in rearwardly converging relationship to the axes of the projections 5 of zone 7 at an angle of preferably about 10°, as indicated by the lines 11 in fragmentary view Fig. 3. The zone 9 is provided for by forming all of the projections 5 within this zone with their axes parallel and horizontal and disposed in rearwardly converging relationship to the axes of the projections 5 of zone 7 at an angle of preferably 10°. Thus the projections 5 of both zones 8 and 9 incline rearwardly toward the vertical plane of the axis of the reflector device but from opposite sides of the reflector, respectively, whereby zone 8 exhibits its greatest luminosity when the source of the light rays projected against it, is laterally offset from the center of the reflector to the left in Fig. 1 from about 10° to about 20° and the zone 9 exhibits its greatest luminosity when the source of projected light is laterally offset from the center of the reflector to the right in Fig. 1 from about 10° to about 20°.

As will be understood in the manufacture of the devices for general use, it is not commercially feasible that the projections 5 be made optically perfect nor is such perfection necessary in a practical construction of reflector. However, in the manufacture of the device it is the aim to provide the cone-projections as nearly of right cone shape as practically possible, as thereby it is believed the best results are obtainable.

It will be understood that the principle embodied in the device shown and utilized by the provision of the side zones 8 and 9, may also be embodied in a device in which similar zones are necessary for the desired deflection of the light rays projected to the device at an angle to the axis of the latter either from above or below such axis. In such case, by way of example, the zone of reflecting portions for the rays projected to the device from above said axis may be provided above the central zone of reflecting portions, and the zone of reflecting portions for the rays projected to the device from below said axis may be provided below said central zone; these upper and lower zones being preferably provided in addition to the zones for the rays projected to the device at an angle to its axis from either lateral side of the device, as exemplified by the zones 8 and 9, which latter, in the case of this particular modification would be reduced in height to permit of the provision of these other zones, and the axes of the reflecting portions for the rays projected to the device from above the axis of the device being preferably substantially parallel and inclining in a rearward direction from above toward the axis of the device and the axes of the reflecting portions for the rays projected from below the axis of the device being preferably substantially parallel and inclining rearwardly from below toward the axis of the device.

The embodying of my invention in a tail light lens utilizing the light behind the lens to cast a warning signal and the reflecting projections to reflect back light projected against them from an approaching car, will be manifest. By way of example, the reflector member would preferably be formed with a portion thereof non-obstructive to the passage of light rays therethrough from the rear source of light to the front, as by providing an area at the center of the member 4 at which no projections 5 would be provided (see Figs. 4 and 5), or so widely spacing the projections 5 as to afford the desired total light-transmission area (see Figs. 6 and 7). However, as aforesaid, since it is not commercially feasible that the projections 5 be made optically perfect and since such perfection is not necessary, considerable light will pass from the rear source of light forwardly through the lens even with the projections 5 arranged as shown in Fig. 1. This forward direct light transmission finds entry into the lens for the most part through the apices of the projections 5 and through the regions of the aforesaid interfitting of the bases of these conical projections. Inasmuch as certain of the aforesaid highway regulations require direct light transmission of an intensity greater than that ordinarily afforded by my Fig. 1 arrangement of parts, I therefore preferably make provision for the required direct light transmission by the omission of certain projections or by spacing the projections as aforesaid.

In Figs. 4 and 5 I have illustrated a tail light lens 4ᵃ which is primarily adapted for use as a tail light lens. This lens 4ᵃ is identical in structure and operation with lens 4 (as indicated by the use of similar reference characters for corresponding parts) with the exception that an area 12 is provided, preferably at the lens center, which has no projections 5. This area 12 permits passage of considerable light forwardly from the tail light source of illumination directly through the lens as aforesaid.

In Figs. 6 and 7 I have illustrated a tail light lens 4ᵇ which is also primarily adapted for use as a tail light lens. This lens 4ᵇ is also identical in structure and operation with lens 4 (as indicated by the use of similar reference characters for corresponding parts) with the exception that the projections 5 are spaced from each other sufficiently to provide areas 13 which permit passage of considerable light forwardly from the tail light source of illumination directly through the lens as aforesaid.

The luminosity of the entire lens when observed by the approaching motorist is, of course, the result of light striking the lens zones each of which zones has reflector units whose optical axes, while parallel to each other, are inclined as a group with respect to the optical axes of the reflector units of the remaining lens zones.

The optical axis of each reflector unit, as applied to the subject matter of the present invention is, of course, that axis of light approach which results in equal reflecting ranges laterally to each side of such optical axis. The mechanical axis of each reflector unit, as applied to the subject matter of the present invention is, of course, that axis about which the reflecting surface portions of each unit are symmetrically formed.

In the illustrated embodiments of my invention each reflector unit axis at 11 is a mechanical axis as well as an optical axis of such unit so that, in the present instance, inclining the mechanical axes of the reflector units 5 of zones or groups 8 and 9 will give the desired effect of inclining the optical axes of the respective reflector unit groups.

While I have illustrated and described a certain particular construction embodying my invention and have described another embodiment thereof I do not wish to be understood as intending to limit it thereto as the same may be variously modified and altered and the invention embodied in other forms of structure without departing from the spirit of my invention.

What I claim as new, and desire to secure by Letters Patent, is:

1. A cover for a motor vehicle tail lamp, comprising, a unitary transparent body having a front face adapted to be presented generally toward a source of light to be reflected and a rear face adapted to be presented generally toward a lamp illuminator, said body transmitting light from said lamp illuminator directly forwardly therethrough, said body having a plurality of groups of internally reflecting units formed integrally with said body and projecting rearwardly to form at least a portion of said rear face for reflecting light back in the approximate direction of said light source, each of said units providing an internally reflecting portion of the rear face of said body, the axes of the units of each of said groups being substantially parallel to each other, the units of each of said groups having their axes lying at acute angles with the axes of the units of the remainder of said groups whereby the reflecting units of each of said groups reflect light generally toward light sources lying in directions spaced from light sources which cause other of said unit groups to reflect light therefrom, only one of said groups of reflecting units being adapted at any time to reflect light received from a light source with the maximum inherent intensity of light reflection for such unit group, said front face presenting smooth surface portions thereof respectively in front of each of said groups of reflecting units.

2. A cover for a motor vehicle tail lamp, comprising, a unitary transparent body having a front face adapted to be presented generally toward a source of light to be reflected and a rear face adapted to be presented generally toward a lamp illuminator, said body transmitting light from said lamp illuminator directly forwardly therethrough, said body having a plurality of groups of substantially contiguous internally reflecting units formed integrally with said body and projecting rearwardly to form at least a portion of said rear face for reflecting light back in the approximate direction of said light source, each of said units having a reflecting surface of revolution tapering in a direction rearwardly from said body, the axes of the units of each of said groups being substantially parallel to each other, the units of each of said groups having their axes lying at acute angles with the axes of the units of the remainder of said groups whereby the reflecting units of each of said groups reflect light generally toward light sources lying in directions spaced from light sources which cause other of said unit groups to reflect light therefrom, only one of said groups of reflecting units being adapted at any time to reflect light received from a light source with the maximum inherent intensity of light reflection for such unit group, said front face presenting a smooth substantially spherical surface in front of said plurality of groups of reflecting units.

3. A cover for a motor vehicle tail lamp, comprising, a unitary transparent body having a front face adapted to be presented generally toward a source of light to be reflected and a rear face adapted to be presented generally toward a lamp illuminator, said body transmitting light from said lamp illuminator directly forwardly therethrough, said body having a plurality of groups of internally reflecting units formed integrally with said body and projecting rearwardly to form at least a portion of said rear face for reflecting light back in the approximate direction of said light source, each of said units having a reflecting surface of revolution tapering in a direction rearwardly from said body, the axes of the units of each of said groups being substantially parallel to each other, the units of each of said groups having their axes lying at acute angles with the axes of the units of the remainder of said groups whereby the reflecting units of each of said groups reflect light generally toward light sources lying in directions spaced from light sources which cause other of said unit groups to reflect light therefrom, only one of said groups of reflecting units being adapted at any time to reflect light received from a light source with the maximum inherent intensity of light reflection for such unit group, said front face presenting a smooth surface in front of said groups of reflecting units.

4. A cover for a motor vehicle tail lamp, comprising, a unitary transparent body having a front face adapted to be presented generally toward a source of light to be reflected and a rear face adapted to be presented generally toward a lamp illuminator, said body transmitting light from said lamp illuminator, directly forwardly therethrough, said body having a plurality of groups of substantially contiguous internally reflecting units formed integrally with said body and projecting rearwardly to form at least a portion of said rear face for reflecting light back in the approximate direction of said light source, each of said units providing an internally reflecting portion of the rear face of said body, the axes of the units of each of said groups being substantially parallel to each other, the units of each of said groups having their axes lying at acute angles with the axes of the units of the remainder of said groups whereby the reflecting units of each of said groups reflect light generally toward light sources lying in directions spaced from light sources which cause other of said unit groups to reflect light therefrom, only one of said groups of reflecting units being adapted at any time to reflect light received from a light source with the maximum inherent intensity of light reflection for such unit group, said front face presenting a smooth substantially spherical surface in front of said plurality of groups of reflecting units.

5. A reflector comprising a unitary transparent body having a front face adapted to be presented generally toward a source of light to be reflected and a rear face, said body having a plurality of groups of internally reflecting units formed integrally with said body and projecting rearwardly to form at least a portion of said rear face for reflecting light back in the approximate direction of said light source, each of said units providing an internally reflecting portion of the rear face of said body, the axes of the units of each of said groups being substantially parallel to each other, the units of each of said groups having their axes lying at acute angles with the axes of the units of the remainder of said groups whereby the reflecting units of each of said groups reflect light generally toward light sources lying in directions spaced from light sources which cause other of said unit groups to reflect light therefrom, only one of said groups of reflecting units being adapted at any time to reflect light received from a light source with the maximum inherent intensity of light reflection for such unit group, said front face presenting smooth surface portions thereof respectively in front of each of said groups of reflecting units.

6. A reflector comprising a unitary transparent body having a front face adapted to be presented generally toward a source of light to be reflected and a rear face, said body having a plurality of groups of substantially contiguous internally reflecting units formed integrally with said body and projecting rearwardly to form at least a portion of said rear face for reflecting light back in the approximate direction of said light source, each of said units providing an internally reflecting portion of the rear face of said body, the axes of the units of each of said groups being substantially parallel to each other, the units of each of said groups having their axes lying at acute angles with the axes of the units of the remainder of said groups whereby the reflecting units of each of said groups reflect light generally toward light sources lying in directions spaced from light sources which cause other of said unit groups to reflect light therefrom, only one of said groups of reflecting units being adapted at any time to reflect light received from a light source with the maximum inherent intensity of light reflection for such unit group, said front face presenting a smooth substantially spherical surface in front of said plurality of groups of reflecting units.

ROY WALTER JOHNSON.